(12) United States Patent
Nakata et al.

(10) Patent No.: US 10,002,633 B2
(45) Date of Patent: Jun. 19, 2018

(54) OPTICAL DISK, OPTICAL DISK RECORDING METHOD, OPTICAL DISK RECORDING DEVICE, AND INTEGRATED CIRCUIT

(71) Applicant: PANASONIC INTELLECTUAL PROPERTY MANAGEMENT CO., LTD., Osaka (JP)

(72) Inventors: Kohei Nakata, Nara (JP); Harumitsu Miyashita, Nara (JP); Naohiro Kimura, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days. days.

(21) Appl. No.: 15/286,324

(22) Filed: Oct. 5, 2016

(65) Prior Publication Data

US 2017/0103780 A1  Apr. 13, 2017

(30) Foreign Application Priority Data

Oct. 7, 2015  (JP) .................................. 2015-199296

(51) Int. Cl.
| | | |
|---|---|---|
| G11B 7/007 | (2006.01) | |
| G11B 7/005 | (2006.01) | |
| G11B 20/24 | (2006.01) | |
| G11B 7/09 | (2006.01) | |
| G11B 7/0037 | (2006.01) | |
| G11B 20/12 | (2006.01) | |

(52) U.S. Cl.
CPC ........ *G11B 7/00718* (2013.01); *G11B 7/0053* (2013.01); *G11B 7/00736* (2013.01); *G11B 7/00745* (2013.01); *G11B 7/0938* (2013.01); *G11B 20/1217* (2013.01); *G11B 20/24* (2013.01); *G11B 7/0037* (2013.01); *G11B 2020/1225* (2013.01); *G11B 2020/1229* (2013.01); *G11B 2020/1238* (2013.01); *G11B 2020/1264* (2013.01); *G11B 2020/1277* (2013.01); *G11B 2020/1287* (2013.01); *G11B 2020/1292* (2013.01); *G11B 2020/1298* (2013.01)

(58) Field of Classification Search
None
See application file for complete search history.

(56) References Cited

U.S. PATENT DOCUMENTS

| | | |
|---|---|---|
| 2002/0191507 A1 | 12/2002 | Tsuboi et al. |
| 2003/0035348 A1 | 2/2003 | Okumura et al. |
| | (Continued) | |

FOREIGN PATENT DOCUMENTS

| | | |
|---|---|---|
| JP | 11-144257 A | 5/1999 |
| JP | 2000-311399 A | 11/2000 |
| | (Continued) | |

*Primary Examiner* — Brian Butcher
(74) *Attorney, Agent, or Firm* — McDermott Will & Emery LLP

(57) ABSTRACT

There are provided an optical disk and an optical disk recording method which are capable of stable data reading in a case where a recording linear density is increased. According to an optical disk of the present disclosure, a run-in pattern recorded in a groove track and a run-in pattern recorded in a land track are made different patterns so that no great change is caused in the amplitude of an acquired signal due to interference between adjacent recording patterns, and thus, data may be stably read.

10 Claims, 7 Drawing Sheets

(56) References Cited

U.S. PATENT DOCUMENTS

| | | |
|---|---|---|
| 2009/0175155 A1 | 7/2009 | Nakata et al. |
| 2010/0329105 A1 | 12/2010 | Nakata et al. |
| 2011/0122750 A1 | 5/2011 | Nakata et al. |
| 2014/0160908 A1 | 6/2014 | Hino et al. |

FOREIGN PATENT DOCUMENTS

| | | |
|---|---|---|
| JP | 2002-352526 A | 12/2002 |
| JP | 5357757 B2 | 12/2013 |
| WO | 2013/140756 A1 | 9/2013 |

FIG. 4

| ZONE ID | m | n |
|---|---|---|
| 1 | 100 | 90 |
| 2 | 100 | 94 |
| 3 | 100 | 100 |
| 4 | 100 | 106 |
| .. | .. | .. |
| 32 | 100 | 200 |

OPTICAL DISK, OPTICAL DISK RECORDING METHOD, OPTICAL DISK RECORDING DEVICE, AND INTEGRATED CIRCUIT

RELATED APPLICATIONS

This application claims the benefit of Japanese Application No. 2015-199296, filed on Oct. 7, 2015, the disclosure of which Application is incorporated by reference herein.

BACKGROUND

1. Technical Field

The present disclosure relates to an optical disk on which data is optically recorded, an optical disk recording method and an optical disk recording device for performing recording/reading of data on the optical disk, and an integrated circuit for performing recording/reading data on the optical disk.

2. Description of the Related Art

As a technology for increasing the recording density per volume of an optical disk, there is a land-and-groove recording technology for increasing the track recording density. This technology, which records data both on grooves and lands, allows higher track recording density than conventional technology, which records data only on grooves or on lands.

A DVD-RAM includes a data recording area and an address area in a track, and an area for demodulating data has to be provided independently in the data recording area and the address area. Accordingly, data recording area is wasted. With respect to this problem, there is disclosed a technology for not wasting the data recording area by recording address information by wobbling of the groove track (see WO 2013/140756 A).

SUMMARY

According to an optical disk of the present disclosure, land tracks and groove tracks are alternately arranged in a radial direction. The optical disk is capable of recording a bit pattern on each of the land tracks and the groove tracks by forming marks and spaces. Each of the land tracks and the groove tracks includes a plurality of record blocks. Each of the plurality of record blocks includes a run-in region and a data region. A predetermined run-in pattern is recordable in the run-in region. A data pattern based on recording target data is recordable in the data region. A first record block and a second record block are recorded, in the land track and the groove track that are adjacent to each other in the radial direction of the optical disk, at a same angular position in a circumferential direction of the optical disk. The first record block is the record block of the land track. The second record block is the record block corresponding to the first record block, among the record blocks of the groove track. A first run-in pattern to be recorded in the run-in region of the first record block and a second run-in pattern to be recorded in the run-in region of the second record block are different from each other.

An optical disk recording method of the present disclosure is an optical disk recording method for performing recording and reading of data on an optical disk. The optical disk includes land tracks and groove tracks each including a plurality of record blocks. The optical disk is capable of recording a bit pattern on each of the land tracks and the groove tracks by forming marks and spaces. Each of the plurality of record blocks includes a run-in region and a data region. The land tracks and the groove tracks are alternately arranged in a radial direction of the optical disk. The optical disk recording method records, in the land track and the groove track that are adjacent to each other in the radial direction of the optical disk, a first record block and a second record block at a same angular position in a circumferential direction of the optical disk. The first record block is the record block of the land track. The second record block is the record block corresponding to the first record block, among the record blocks of the groove track. According to the optical disk recording method of the present disclosure, a first run-in pattern is recorded in the run-in region of the first record block. A second run-in pattern different from the first run-in pattern is recorded in the run-in region of the second record block. A data pattern obtained by modulating recording target data with a predetermined modulation code is recorded on the data region.

According to the optical disk and the optical disk recording method of the present disclosure, stability of data reading is improved in a case where a land-and-groove recording technology with increased track recording density is used and the recording linear density is increased.

BRIEF DESCRIPTION OF THE DRAWINGS

FIG. 4 is a diagram showing a zone table according to the first exemplary embodiment;

DETAILED DESCRIPTION

Hereinafter, an exemplary embodiment will be described in detail with reference to the drawings as appropriate. However, unnecessarily detailed description may be omitted. For example, detailed description of already well-known matters and repeated description of substantially the same structure may be omitted. All of such omissions are intended to facilitate understanding by those skilled in the art by preventing the following description from becoming unnecessarily redundant.

Moreover, the appended drawings and the following description are provided for those skilled in the art to fully understand the present disclosure, and are not intended to limit the subject described in the claims.

First Exemplary Embodiment

<1-1. Configuration>

Figure 1:
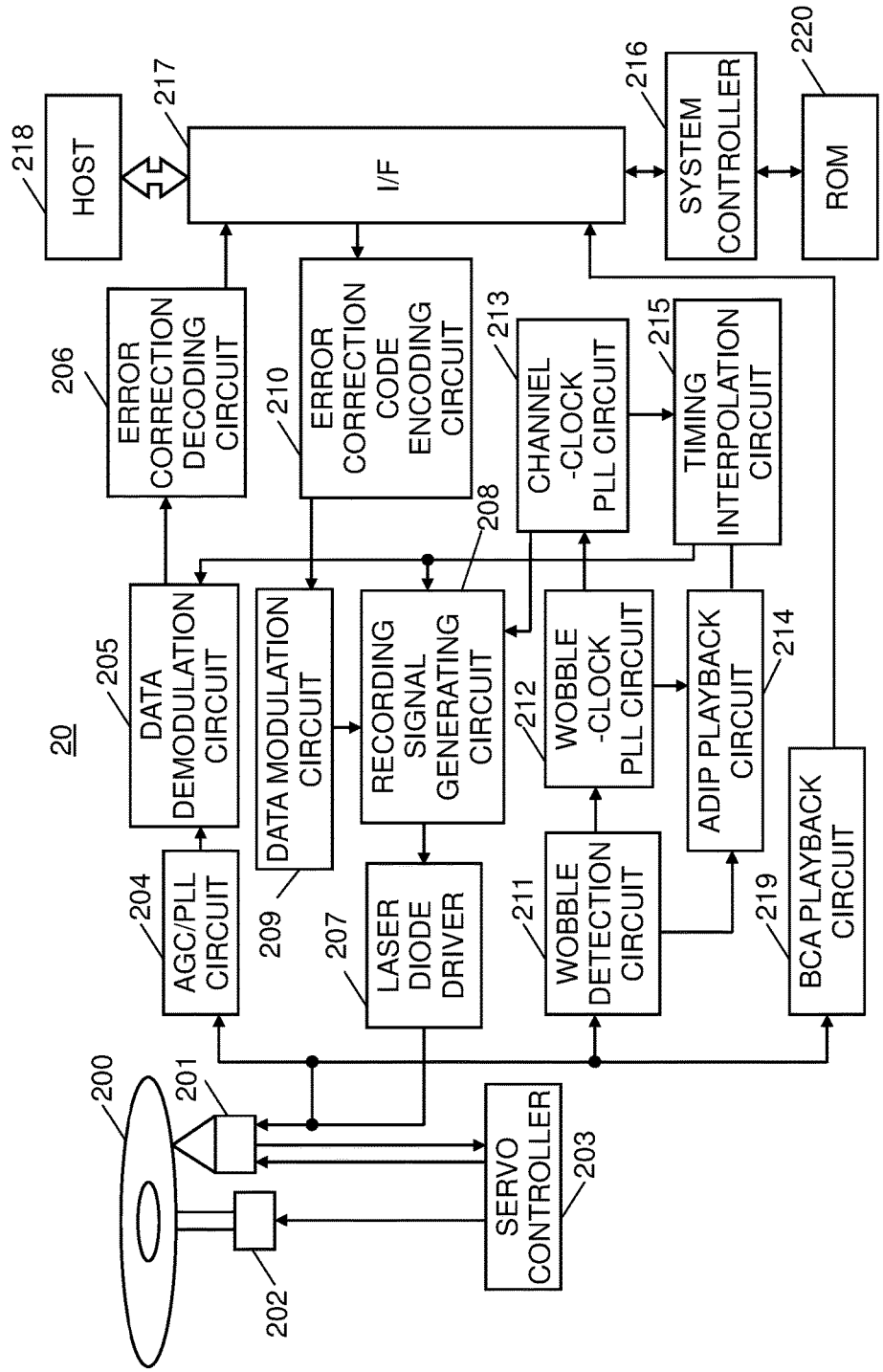
FIG. 1 is a block diagram showing a configuration of an optical disk device according to a first exemplary embodiment.

FIG. 1 is a block diagram showing a configuration of optical disk device 20 according to a present exemplary embodiment. As shown in FIG. 1, optical disk device 20 includes optical head 201, spindle motor 202, servo controller 203, AGC (Automatic Gain Control)/PLL (Phase Locked Loop) circuit 204, data demodulation circuit 205, error correction decoding circuit 206, laser diode driver 207, recording signal generating circuit 208, data modulation circuit 209, and error correction code encoding circuit 210. Optical disk device 20 further includes BCA (Burst Cutting Area) playback circuit 219, wobble detection circuit 211, wobble-clock PLL circuit 212, channel-clock PLL circuit 213, ADIP (ADress In Pre-Groove) playback circuit 214, timing interpolation circuit 215, system controller 216, I/F circuit 217, and ROM (Read Only Memory) 220.

Optical disk device 20 performs recording and reading of data on optical disk 200. Tracks are spirally formed on optical disk 200, from the inner circumference to the outer circumference. The tracks are constituted from groove tracks that are formed on grooves, and land tracks that are formed between adjacent groove tracks. That is, the land tracks and the groove tracks are alternately arranged on optical disk 200 in a radial direction. Optical disk device 20 records data on both the groove tracks and the land tracks.

Optical disk device 20 records a bit pattern of recording data on optical disk 200 by forming marks and spaces on each of the land tracks and the groove tracks of optical disk 200. More specifically, optical disk device 20 modulates a bit pattern of recording data, and generates a data signal indicating marks and spaces to be formed on optical disk 200. Also, as described later, optical disk device 20 generates a run-in signal indicating marks and spaces for AGC/PLL circuit 204 to perform a pull-in operation. Optical disk device 20 forms, on optical disk 200, the marks and spaces corresponding to the run-in signal and the marks and spaces corresponding to the data signal. Marks and spaces formed on optical disk 200 based on a run-in signal will be referred to collectively as a run-in pattern. Similarly, marks and spaces formed on optical disk 200 based on a data signal will be referred to collectively as a data pattern. A run-in pattern is a pattern that a pattern of a predetermined length (for example, 60T) including combinations of marks and spaces of several lengths repeats for one or more times. Additionally, 1T corresponds to one channel bit. A channel bit is the smallest unit of pattern length for writing a pattern. That is, the length of a pattern of a mark and a space is integral multiples of the channel bit. The mark and the space are inverted when the bit of the data pattern or the run-in pattern is 1, and are not changed when the bit is 0.

Figure 2:
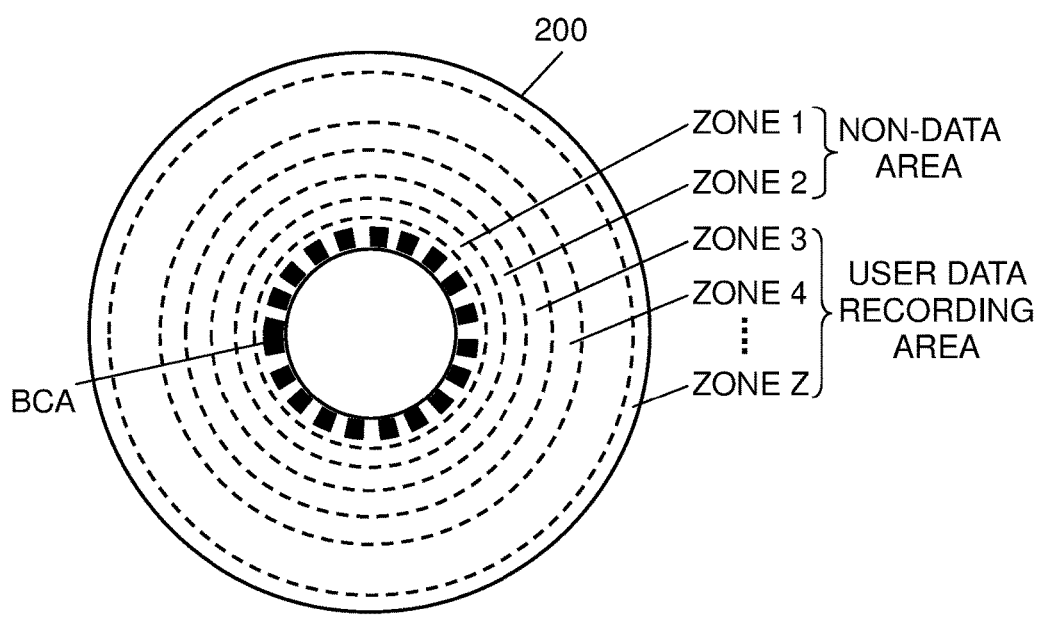
FIG. 2 is a diagram showing zones of an optical disk according to the first exemplary embodiment.

Now, optical disk 200 according to the present exemplary embodiment will be described. FIG. 2 is a diagram showing zones of optical disk 200 of the present exemplary embodiment. The recording surface of optical disk 200 includes a BCA (Burst Cutting Area) and a recordable area in this order from the inner circumference.

Disk management information unique to each disk, such as the disk ID, the number of recording layers, and the zone format identifier of optical disk 200, is recorded in the BCA. The zone format identifier is an identifier indicating the type of format of data recorded on optical disk 200. For example, zone format identifier 1 indicates that optical disk 200 is an optical disk on which recording is performed at a linear density of a data capacity of 50 GB per layer. Zone format identifier 2 indicates that optical disk 200 is an optical disk on which recording is performed at a linear density of a data capacity of 60 GB per layer. Zone format identifier 3 indicates that optical disk 200 is an optical disk on which recording is performed at a linear density of a data capacity of 80 GB per layer. A predetermined zone table (Channel-Bit-Length Adjustment Zone Table) is determined for each zone format identifier.

The recordable area is divided into Z zones (Z is a natural number of two or more) in the radial direction. Optical disk device 20 sets the frequency of recording clock or the recording velocity (linear velocity) for each of the plurality of zones.

A non-data area and a user data recording area are included in the recordable area of optical disk 200. For example, as shown in FIG. 2, zone 1 and zone 2 on the inner circumferential side are made the non-data areas, and zone 3 to zone Z are made the user data recording areas.

The user data recording area is an area for recording recording data (user data) recording of which is requested by host 218.

The non-data area includes a laser-power calibration area, a servo adjusting area, and a data management area. The laser-power calibration area is an area for appropriately adjusting laser power of optical head 201 driven by laser diode driver 207. The servo adjusting area is used for adjusting servo so that the light beam, irradiated from optical head 201 to optical disk 200, is focused on groove tracks and land tracks of optical disk 200 in scanning. The data management area is an area for managing the state of the user data recording area and a defect portion such as a flaw on optical disk 200.

A track is formed to wobble at a period corresponding to a radial position on optical disk 200. A spatial wavelength of wobbling is approximately proportionate to the radial position of the track, that is, the distance from a center of optical disk 200. That is, the central angle of optical disk 200 corresponding to the spatial wavelength of wobbling of the track is constant regardless of the radial position of the track. In other words, the spatial wavelength of wobbling is longer on the outer circumference in proportion to the radial position. In this manner, wobbling of the track is configured radially from the center of optical disk 200.

ADIP information including address information of a track on optical disk 200 is modulated and embedded in the wobbling of the track. One round of the track on optical disk 200 is equally divided into seven tracks at a constant angle regardless of the radial position. One piece of ADIP information is embedded in each track obtained by the division. The central angle of optical disk 200 corresponding to the spatial wavelength of wobbling of the track is constant regardless of the radial position, and thus the number of wobblings included in each of the seven tracks which have been divided, that is, the included number of wobblings of one wavelength, is constant regardless of the radial position. That is, the wave number of the wobbling which corresponds to one piece of ADIP information is constant regardless of the radial position.

Figure 3:
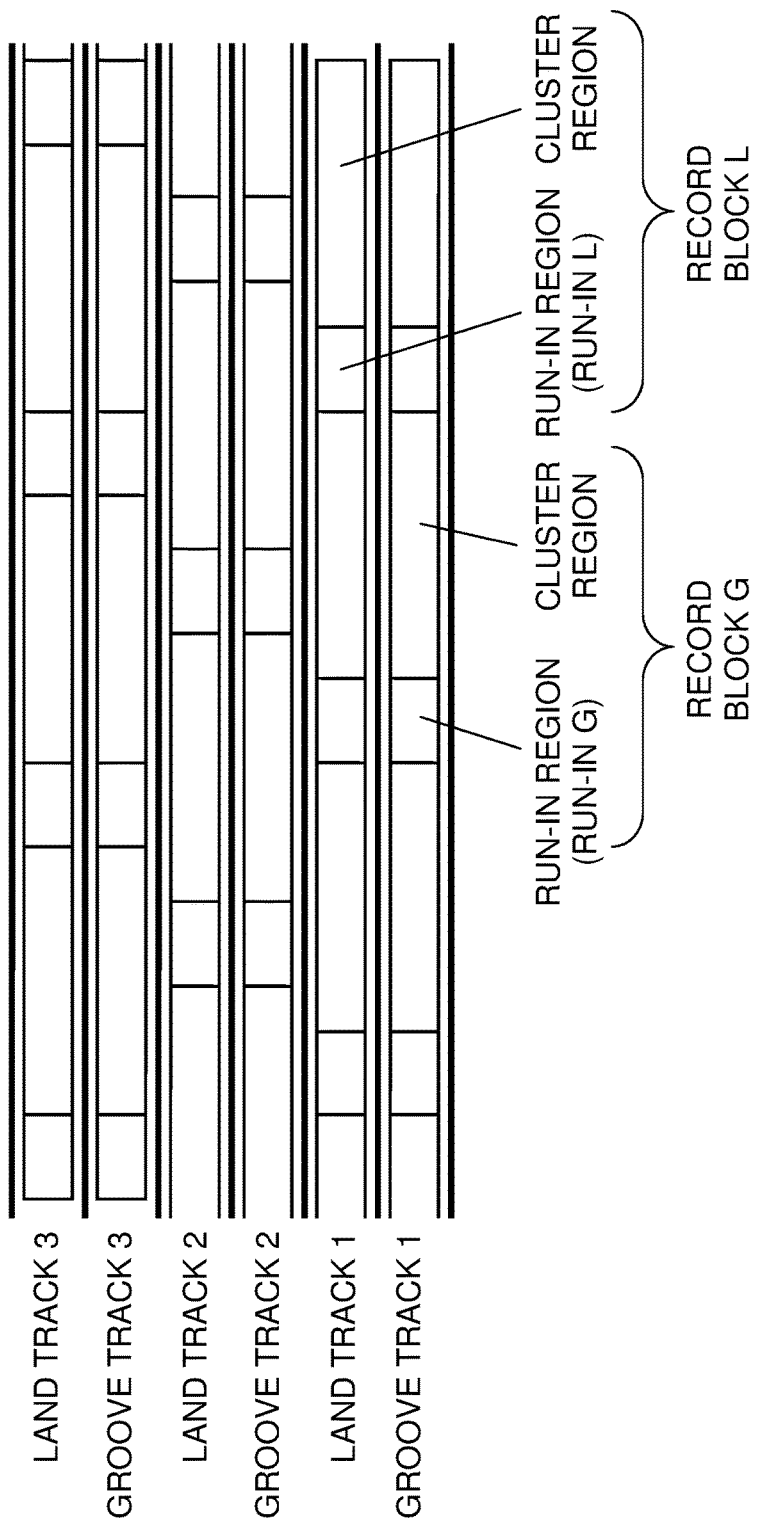
FIG. 3 is a diagram showing record blocks of the optical disk according to the first exemplary embodiment.

Optical disk device 20 records data in groove tracks and land tracks based on the address information obtained from the ADIP information. FIG. 3 is a schematic diagram showing record blocks of data recorded in the groove tracks and the land tracks. In FIG. 3, the left-right direction is the circumferential direction of optical disk 200, and the top is the outer circumference in the radial direction, and the bottom is the inner circumference in the radial direction. FIG. 3 shows that groove track 1, land track 1, groove track 2, land track 2, groove track 3, and land track 3 are arranged in this order from the inner circumferential side of optical disk 200. A plurality of record blocks are arranged in the land tracks and the groove tracks in the circumferential direction. Each record block is consisting of a run-in region and a cluster region. A run-in region is an area where a pattern (a run-in pattern) for a pull-in operation of AGC/PLL circuit 204 is to be recorded. A cluster region is an area where a data pattern based on recording data received from host 218 is to be recorded. In the present exemplary embodiment, the run-in pattern to be recorded in the run-in region is different for record block G to be recorded in a groove track and record block L to be recorded in an adjacent land track. Run-in G is recorded as the run-in pattern in record block G of the groove track. Run-in L is recorded as the run-in pattern in record block L of the land track. The cluster region is an example of a data region. Run-in L is an example of a first run-in pattern. Run-in G is an example of a second run-in pattern.

A pair of a groove track and a land track that are adjacent to each other in the radial direction, such as one groove track and one land track that is adjacent to the groove track on the outer circumferential side, is taken as one set. According to such a set of groove track and land track, the record block of the land track and the record block of the groove track are arranged (recorded) at a same position (same angular position) in the circumferential direction. Here, the record block of the land track is regarded as a first record block, and the record block of the groove track corresponding to the first record block is regarded as a second record block. Additionally, the record block of the groove track corresponding to the first record block means that the record block is adjacent to the first record block where the record block is included in the groove track. Additionally, that the first record block and the second record block are arranged at the same angular position in the circumferential direction means that the position (angular position), on the optical disk 200 in the circumferential direction, at the boundary of the run-in region and the cluster region of each record block is at the same position for the first record block and the second record block. Also, the run-in region and the cluster region of the first record block are adjacent to the run-in region and the cluster region of the second record block in the radial direction of optical disk 200. For example, with the set of groove track 1 and land track 1 in FIG. 3, the record blocks are arranged at the same position in the circumferential direction of optical disk 200, while being adjacent to each other in the radial direction. The same thing is true for groove track 2 and land track 2, and groove track 3 and land track 3. With a set of corresponding groove track and land track, run-in L, which is the run-in region of a record block of the land track, and run-in G, which is the run-in region of a record block of the groove track, are recorded at the same position in the circumferential direction of optical disk 200, while being adjacent to each other in the radial direction. In the following, an adjacent record block is defined to be a record block corresponding to the other record block among a corresponding pair of a first record block and a second record block. Also, an adjacent run-in region is to refer to the other of one of the run-in region of the first record block and the run-in region of the second record block.

Optical disk device 20 in FIG. 1 will be described again. Spindle motor 202 rotates optical disk 200. Optical head 201 records data on optical disk 200 by irradiating light beams to optical disk 200. Also, optical head 201 read-outs data on optical disk 200 with irradiated light beams. Light beams irradiated from optical head 201 are focused on a track provided on optical disk 200. Spindle motor 202 rotates optical disk 200 for scanning track with focused light beam.

Servo controller 203 controls optical head 201 and spindle motor 202 for scanning tracks provided on optical disk 200. In order to access a target track, servo controller 203 controls movement so that light beam is focused on a desired track. Servo controller 203 controls the position of optical head 201 and the rotation speed of spindle motor 202 such that optical head 201 scans optical disk 200 at a constant linear velocity.

I/F circuit (interface circuit) 217 receives, from host 218, recording data to be recorded on optical disk 200. Also, I/F circuit 217 sends, to host 218, acquired data which is acquired from optical disk 200.

Error correction code encoding circuit 210 adds parity to the recording data received from I/F circuit 217 for error correction.

Wobble detection circuit 211 generates wobble signal, which is based on time period of wobbling of the track, from an acquired signal from optical disk 200. Optical disk 200 rotates while facing optical head 201. Because a track is wobbled, the position of the track changes in the radial direction, related to the position where the light beam focuses, dependent on the position in the circumferential direction on optical disk 200. Reflectance of focused light beams is thereby changed at a frequency corresponding to the spatial wavelength of wobbling of the track. That is, the intensity of reflected light detected by optical head 201 periodically changes according to the spatial wavelength of wobbling and the linear velocity of optical disk 200 at the track. Wobble detection circuit 211 detects this periodic change as a waveform, and outputs the same as a wobble signal. In the case where optical disk 200 is rotated at a constant linear velocity, the frequency of the wobble signal is higher as the track is on the inner circumference.

Wobble-clock PLL circuit 212 generates a pulse signal corresponding to the frequency of the wobble signal. Wobble-clock PLL circuit 212 further generates a wobble clock by multiplying the frequency of the generated pulse signal by a predetermined factor. The frequency of the wobble clock, that is, the number of pulses per unit time, is dependent on the spatial wavelength of wobbling of the track and the linear velocity of optical disk 200. Also, the number of pulses of the wobble clock corresponding to one piece of ADIP information is constant regardless of the radial position.

ADIP playback circuit 214 acquires the ADIP information from the wobble signal and the wobble clock.

Channel-clock PLL circuit 213 generates a recording clock that is in synchronization with the phase of the wobble clock and whose frequency is n/m times (m and n are natural numbers) the frequency of the wobble clock. The number of bits in a bit pattern of recording data per spatial wavelength (one wavelength) of wobbling is proportionate to the value of n/m. The m and n are pre-set values included in a zone table. That is, the value of n/m is set for each zone of optical disk 200. The m, n and n/m are examples of information about the linear density of data for each zone. The values of m and n are supplied by system controller 216.

Now, a description will be given on a zone table. A zone table is a table holding information about recording and reading for each zone, with respect to types of optical disks 200 recording and reading of which may be performed by optical disk device 20. For example, a zone ID, m and n are set in a zone table for optical disk 200, for each of zone 1 to zone Z.

The zone table of optical disk 200 is associated with a zone format identifier corresponding to optical disk 200. Such a zone table is stored in ROM 220 for each format identifier of an optical disk recording and reading of which may be performed by optical disk device 20.

FIG. 4 is a diagram showing an example of the zone table according to the present exemplary embodiment. In FIG. 4, the values of m and n are set for each zone. The zone IDs are set from 1 to 32.

Optical disk device 20 in FIG. 1 will be described again. Timing interpolation circuit 215 specifies a position of recording/reading recording data from the ADIP information and the values of n and m sent from system controller 216.

Data modulation circuit 209 generates a modulated signal (data signal) that is obtained by modulating recording data including a parity from error correction code encoding circuit 210 according to a predetermined modulation code.

Recording signal generating circuit 208 generates a recording signal in synchronization with a recording clock generated by channel-clock PLL circuit 213, and according to the position specified by timing interpolation circuit 215. The recording signal includes a run-in signal indicating the run-in pattern of recording in the run-in region, and a data signal indicating the data pattern of recording in the cluster region. The run-in signal indicating run-in G is regarded as run-in signal G, and the run-in signal indicating run-in L is regarded as run-in signal L. As shown in FIG. 3, the recording signal to be recorded in record block G of the groove track includes the data signal to be recorded in the cluster region and run-in signal G. The recording signal to be recorded in record block L of the land track includes the data signal to be recorded in the cluster region and run-in signal L. Furthermore, recording signal generating circuit 208 outputs a predetermined run-in signal for run-in signal G in the recording signal, and outputs another predetermined run-in signal for run-in signal L in the recording signal. Run-in signal G and run-in signal L are stored in ROM 220. System controller 216 acquires run-in signal G and run-in signal L from ROM 220, and sends the run-in signals to recording signal generating circuit 208. Marks and spaces formed on optical disk 200 based on the recording signal generated in the above manner are recording patterns.

Laser diode driver 207 converts the recording signal into light pulses to accurately form marks on optical disk 200. That is, a laser of optical head 201 is driven based on the recording signal.

As described above, a recording signal generated by recording signal generating circuit 208 is recorded on optical disk 200 based on a recording clock. The frequency of the recording clock is n/m times the frequency of the wobble clock. Accordingly, spatial length of one bit of the recording signal on optical disk 200 is m/n of the spatial wavelength of the wobbling of the track which includes the one bit. That is, if the value of n increases or the value of m decreases, the spatial length of one bit of the recording signal to be recorded on optical disk 200 is shorten. This may increase the linear density. Moreover, the spatial wavelength of wobbling of the track becomes longer on the outer circumferential side in accordance with the radial position on optical disk 200, and thus, m and n are set such that n/m correspondingly becomes greater. The linear density of recording on optical disk 200 may thereby be made approximately constant.

Optical disk device 20 of the present exemplary embodiment sets the values of m and n for each zone of optical disk 200. By setting m and n for each zone in such a way that n/m becomes greater for a zone on the outer circumferential side with a greater zone ID, the linear density of recording on optical disk 200 may be made approximately constant. That is, it is possible to make the range of linear density of the recording signal fall within a constant range.

AGC/PLL circuit 204, data demodulation circuit 205, and error correction decoding circuit 206 read data which is recorded on optical disk 200.

AGC/PLL circuit 204 controls amplification of an acquired signal so as to demodulate an acquired signal from optical disk 200. AGC/PLL circuit 204 further generates a synchronous clock based on the acquired signal so that the synchronous clock synchronizes to the acquired signal.

Data demodulation circuit 205 demodulates recorded data from the acquired signal according to a position specified by timing interpolation circuit 215. Specifically, data demodulation circuit 205 compares signal amplitude of the acquired signal with signal amplitude of a plurality of expected waveforms, and selects the most similar one from the expected waveforms. Each of the plurality of expected waveforms is a waveform of an acquired signal that is expected to be acquired when the pattern, corresponding to the expected waveform, recorded on optical disk 200 is scanned. Data demodulation circuit 205 selects the pattern corresponding to the selected expected waveform as a demodulation result. Data demodulation circuit 205 outputs demodulated data to error correction decoding circuit 206 based on the selected demodulation result.

Error correction decoding circuit 206 corrects bit errors included in the demodulated data, and recovers data recorded on optical disk 200.

ROM 220 is configured by a flash memory. ROM 220 stores programs to be used by system controller 216 to control the entire optical disk device 20. Also, ROM 220 stores the zone table.

BCA playback circuit 219 acquires disk management information from an acquired signal obtained by scanning BCA.

System controller 216 controls each circuit and also controls communication with host 218 by reading and executing the programs stored in ROM 220. System controller 216 reads, from the zone table, the values of m and n corresponding to the zone including a recording/reading target position, and sends the values to channel-clock PLL circuit 213 and timing interpolation circuit 215 of the values. System controller 216 controls each unit of optical disk device 20 in such a way that data is recorded based on the recording clock generated by channel-clock PLL circuit 213 and the recording position specified by timing interpolation circuit 215. Data modulation circuit 209, recording signal generating circuit 208, laser diode driver 207, and optical head 201 record data based on the recording clock and the recording position.

<1-2. Operation>

Next, an operation of optical disk device 20 according to the present exemplary embodiment will be described. First, an operation that is performed at the time of mounting optical disk 200 on optical disk device 20 according to the present exemplary embodiment will be described. When optical disk 200 is mounted on optical disk device 20, BCA playback circuit 219 acquires the BCA recorded on optical disk 200, and acquires the disk management information.

System controller 216 receives the disk management information from BCA playback circuit 219, and extracts the zone format identifier from the disk management information. System controller 216 specifies the zone table corresponding to the zone format identifier among the zone tables stored in ROM 220, and acquires the specified zone table.

Next, an operation of recording on optical disk 200 by optical disk device 20 according to the present exemplary embodiment will be described.

I/F circuit 217 acquires recording data transmitted from host 218 and acquires the logical address of a recording destination. The recording data is divided into predetermined units of data blocks, and is sent to error correction code encoding circuit 210 on a per data block basis.

Error correction code encoding circuit 210 adds parity to each data block of the recording data for error correction.

Data modulation circuit 209 modulates the recording data including parity code into a data signal with 1-7PP (Parity Preserve) modulation code, for example.

Recording signal generating circuit 208 outputs recording signal including data signal and run-in signal which is run-in signal G or run-in signal L. Each of run-in signal G and run-in signal L is a repeated signal that a signal of predetermined pattern repeats.

A run-in pattern is a pattern that is recorded in a run-in region based on a run-in signal. AGC/PLL circuit 204 controls amplification of an acquired signal and generates a synchronous clock from the acquired signal using the run-in pattern.

AGC/PLL circuit 204 controls amplification of the acquired signal adapting to the amplitude of the acquired signal, and at this time, a transient response time for gain to follow the change in the amplitude is caused. Accordingly, to reduce the transient response time, difference between the amplitude of the acquired signals of run-in region and of cluster region should be small. That is, the run-in pattern is set to such a pattern that the average amplitude of the acquired signal obtained from the run-in pattern and the average amplitude of the acquired signal obtained from the data pattern recorded in the cluster region are approximately the same.

Conventionally, for simple and stable operation of AGC/PLL circuit 204, the run-in pattern recorded in the run-in region was a repetition of a simple repeat pattern.

On the other hand, with a land-and-groove recording technology of recording in both the groove tracks and the land tracks to increase the recording density, a noise due to a recording pattern of an adjacent track greatly leaks to the acquired signal of a scanning target track.

Figure 5:
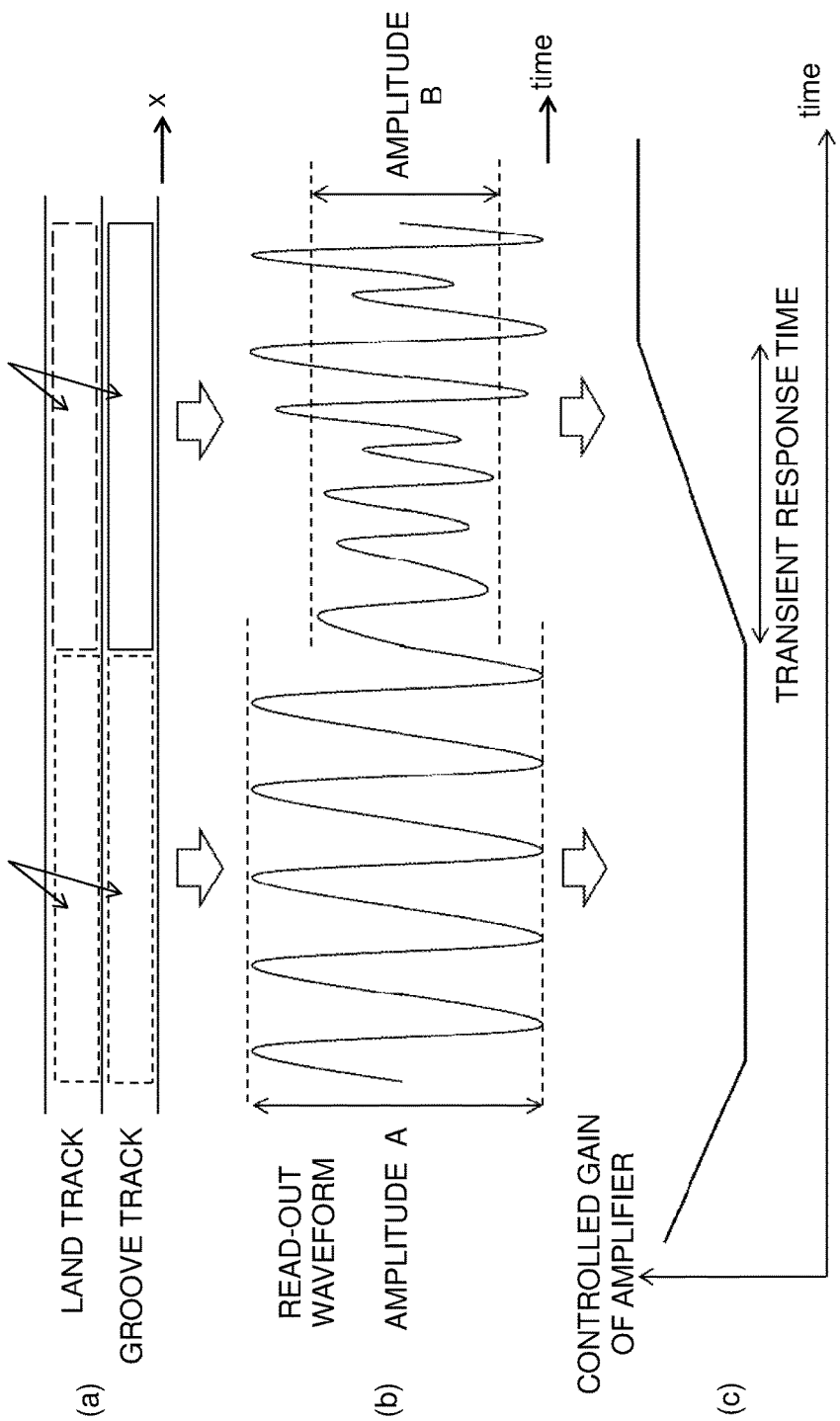
FIG. 5 is a diagram showing amplitude of an acquired signal and gain control according to the first exemplary embodiment.

Now, a description will be given on an acquired signal where a groove track and a land track that are adjacent to each other are taken as one set and record blocks are arranged at the same position in the circumferential direction of optical disk 200. FIG. 5 is a diagram showing a relationship among a recording pattern, the amplitude of corresponding acquired signal, and gain of an amplifier for amplifying the acquired signal. FIG. 5 shows recording patterns recorded in a land track and a groove track that are adjacent to each other. The left halves of the recording patterns shown in FIG. 5 indicate the run-in regions, and the right halves indicate the cluster regions. The read-out waveform shown in FIG. 5 indicates the waveform of an acquired signal that is obtained when the recording pattern of one of the tracks (for example, the land track) is scanned by optical head 201. The left-right direction of the read-out waveform in FIG. 5 corresponds to the left-right direction of the recording patterns of the tracks. That is, the read-out waveform shown in FIG. 5 is a time-domain waveform that is obtained when the recording pattern is scanned from left to right. FIG. 5 further shows transient changes of the gain of the amplifier controlled by AGC/PLL circuit 204 when the read-out waveform shown in FIG. 5 is obtained. A position in the left-right direction of the gain of the amplifier shown in FIG. 5, positions in the left-right direction of the recording patterns of the tracks, and a position in the left-right direction of the read-out waveform correspond to one another.

Data is recorded in the right-halves of the recording patterns shown in FIG. 5. Because different pieces of data are recorded in the land track and the groove track, the recording patterns recorded in the tracks are also different patterns. A case will be described where there is no correlation between the recording pattern recorded in the land track and the pattern recorded in the groove track. In this case, there is a low correlation between the waveform of a noise caused by the recording pattern of the adjacent track and the waveform of the acquired signal obtained from the recording pattern of the target track to be read. Accordingly, the amplitude of the acquired signal including the noise is not greatly different compared to the amplitude of the acquired signal without noise.

On the other hand, the left halves of the recording patterns shown in FIG. 5, that is, the recording patterns recorded in the run-in regions, are repetitions of simple repeat patterns by a predetermined number of times. Here, a case is considered where the run-in pattern of the land track and the run-in pattern of the groove track completely match each other. At this time, there is a high correlation between the waveform of a noise caused by the recording pattern of the adjacent track and the waveform of the acquired signal obtained from the recording pattern of the target track. Accordingly, the noise from the adjacent track and the acquired signal of the target track interfere with each other, and the amplitude of the acquired signal including the noise may possibly become extremely great (or small).

Accordingly, as shown in FIG. 5, in the case where the run-in patterns are the same for the adjacent record blocks of a set of groove track and land track, and the recording patterns of pieces of data recorded in the cluster region are different, a great difference is caused in the amplitude of the acquired signal between the run-in region and the cluster region. AGC/PLL circuit 204 performs gain control to maintain constant amplitude of the acquired signal, but there is a transient response time until the acquired signal is stabilized at a desired amplitude. In the transient response time, the waveform of the acquired signal is deteriorated, and this may cause burst errors in the demodulation result of data demodulation circuit 205. Particularly, when a fatal burst error occurs, there is a possibility that the error in data cannot be corrected by error correction decoding circuit 206, and that the data becomes unreadable.

Optical disk device 20 according to the present exemplary embodiment records different patterns in the run-in regions that are adjacent to each other on optical disk 200, that is, run-in G and run-in L. This stabilizes amplitude of the read-out waveform suppressing the influence of the adjacent run-in pattern while scanning the run-in region. If the amplitude of the read-out waveform in the run-in region is stable, occurrence of the transient response time is suppressed.

Figure 6:
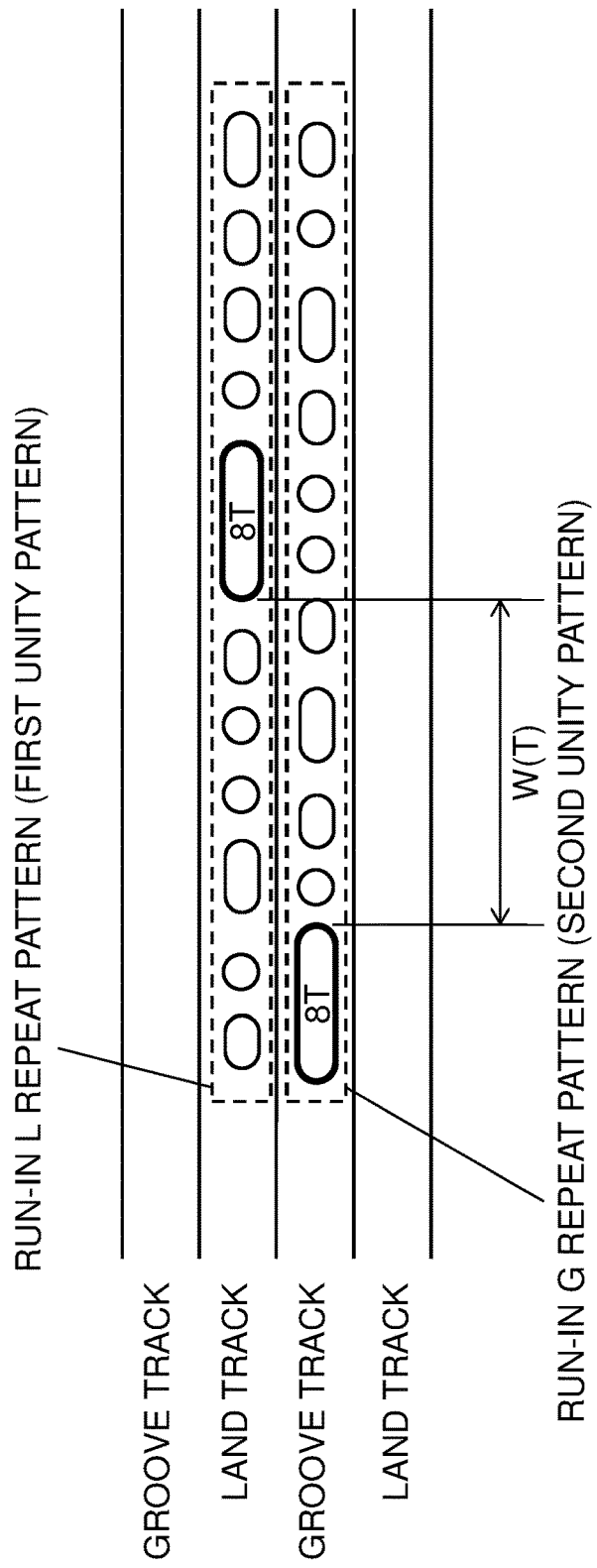
FIG. 6 is a diagram showing a run-in recording pattern according to the first exemplary embodiment.

Recording signal generating circuit 208 outputs different predetermined run-in signals as run-in signal G and run-in signal L on which run-in G and run-in L are based. FIG. 6 shows a repeat pattern (a second unity pattern) of run-in G and a repeat pattern (a first unity pattern) of run-in L. A repeat pattern is determined in such a way that the average amplitude of the acquired signal in the run-in region and the average amplitude of the acquired signal in the cluster region are approximately the same. Specifically, an 8T mark/space, which is the longest mark/space length, in a data pattern is included at least once. In a repeat pattern, 6T or less is used as the length of mark/space other than the 8T mark/space. Additionally, the 8T mark/space is a pattern, in a recording pattern recorded on optical disk 200, where marks or spaces are continuous for 8 channel bits. Here, the 8T mark/space, which is the longest pattern in a repeat pattern, will be referred to also as the longest pattern.

Additionally, the pattern of marks/spaces to be recorded on optical disk 200 is generated by RLL modulation coding (Run Length Limited encoding). Here, a mark will be expressed as M, and a space as S. Also, 1 in a recording pattern corresponds to inversion, and 0 to non-inversion. For example, in a case where a recording pattern is "01000010010", the pattern of marks/spaces to be recorded on optical disk 200 is "SMMMMMSSSMM" or "MSSSSSMMMSS".

Short marks/spaces are desirably not used in a recording pattern of a run-in region to be recorded on optical disk 200. For example, in a run-in region, 1T and 2T marks/spaces are not used. When short marks/spaces are not used for a recording pattern in a run-in region, signal processing by AGC/PLL circuit 204 may be made stable. This is because, when the spatial length of the pattern of marks/spaces is short compared to an optical diffraction limit, the amplitude of the acquired signal is reduced. Additionally, the optical diffraction limit is dependent on the laser wavelength of optical head 201 and a numerical aperture of the lens. Moreover, marks/spaces are inverted odd number of times in a single repeat pattern. This increases the effective length of the repeat pattern including the inversion of polarity of mark/space. Furthermore, the 8T mark/space of run-in G and the 8T mark/space of run-in L are arranged such that the in-between distance in the circumferential direction of optical disk 200 is longer than the minimum distance of intersymbol interference. An acquired signal obtained by irradiating laser light to a target track where a pattern is recorded includes noise caused by intersymbol interference between patterns on the target track and patterns on the adjacent track and between patterns which is nearly disposed on the target track in the circumferential direction of optical disk 200. The 8T mark/space, whose amplitude is the greatest in the repeat pattern, is arranged at separate positions between the land track and the groove track. For example, the 8T mark/space of the land track and the 8T mark/space of the groove track are arranged at positions shifted by W[T] in the circumferential direction of optical disk 200. In the case where the width of the intersymbol interference is 9T, that is, in the case where intersymbol interference between marks/spaces separated by 9T is the issue, a distance of 10[T] or more is required for W. Intersymbol interference between repeat patterns may thereby be suppressed. Because intersymbol interference is suppressed, the waveform of the acquired signal can be stabilized, and signal processing by AGC/PLL circuit 204 can be stabilized. More preferably, the 8T mark/space of run-in G and the 8T mark/space of run-in L are arranged at positions where the in-between distance in the circumferential direction is the greatest for the run-in patterns. For example, in the case where the lengths of repeat patterns of run-in G and run-in L are 60T, the 8T marks/spaces of run-in G and run-in L are arranged such that the in-between distance in the circumferential direction is about 30T. That is, the 8T mark/space of the repeat pattern of run-in G is positioned in the middle of an 8T mark/space of the repeat pattern of adjacent run-in L and an 8T mark/space of the repeat pattern that is next to the afore-mentioned repeat pattern in the circumferential direction of optical disk 200.

Also, to average the influence, a short mark/space of 3T or 4T, which is half or less than 8T, is arranged at a position adjacent to the 8T mark/space. That is, a 3T or 4T mark/space is arranged in the pattern in run-in L, adjacent to the 8T mark/space in run-in G. In the same manner, a 3T or 4T mark/space is arranged in the pattern in run-in G, adjacent to the 8T mark/space in run-in L. Therefore, a noise leaking from the recording pattern of the adjacent track to an acquired signal obtained by scanning the 8T mark/space may be suppressed. 8T rarely appears in a data signal recorded in the cluster region, and two or more 8T patterns may not appear in the range where intersymbol interference is caused. By preventing, also in the run-in region, long marks/spaces from existing in a range where intersymbol interference is caused, the amplitude in the run-in region may be prevented from becoming too great or too small compared to the amplitude of a modulation signal in the cluster region. According to a pattern satisfying the conditions described above, the difference between the average amplitude of the acquired signal in the run-in region and the average amplitude of the acquired signal in the cluster region where a random pattern is recorded may be made small.

A case where the length of a run-in pattern is 60T will be described as an example of a repeat pattern satisfying the conditions. A run-in pattern is expressed by assuming that one bit corresponds to 1T, and that 1 is a bit pattern indicating an inverting position of mark/space. For example, the repeat pattern in run-in G is "01000000010000100100010010001001000100010001000100-00100100100010", and the repeat pattern in run-in L is "0100010010001000100000100010001000000010001001-00100100100010". With respect to run-in G, an 8T mark/space is arranged with 2T as the starting point. With respect to run-in L, an 8T mark/space is arranged with 31T as the starting point. In this case, the distance between the 8T marks/spaces in the circumferential direction is 29T. Run-in signal G and run-in signal L on which such run-in G and run-in L are based are stored in ROM 220.

Laser diode driver 207 generates a castle-type pulse waveform to accurately form recording marks on optical disk 200 based on a recording signal generated by recording signal generating circuit 208. Laser diode driver 207 outputs, to optical head 201, a drive signal for driving the laser, based on the generated pulse waveform.

Optical head 201 records a recording pattern based on the recording signal by irradiating a laser pulse at a position to optical disk 200 corresponding to the logical address of a recording destination.

Optical disk 200 is structured having ADIPs added radially. Accordingly, channel-clock PLL circuit 213 controls the recording clock so that the linear density of a recording signal within the recording surface of optical disk 200 becomes approximately constant. Wobble detection circuit 211 detects a wobble signal according to the wobbling of the track. Wobble-clock PLL circuit 212 generates a wobble clock that is in synchronization with the wobble signal. Channel-clock PLL circuit 213 operates in such a way that the phase of a clock obtained by dividing the wobble clock by m and the phase of a clock obtained by dividing the recording clock by n are synchronized with each other, and thus generates a recording clock of a frequency n/m times the wobble clock.

System controller 216 controls the recording operation described above. System controller 216 first specifies, based on the logical address of the recording destination acquired by I/F circuit 217, the data address where the recording data is to be recorded, and the zone and the track (groove track or land track) including the data address. The data address here is a physical address on optical disk 200 determined based on the ADIP, the physical address being for designating the recording/reading position of recording data. System controller 216 refers to the zone table, and acquires m and n of the zone ID corresponding to the specified zone.

Channel-clock PLL circuit 213 operates, using the value of n/m determined for each zone, in such a way that the phase of a clock obtained by dividing the wobble clock by m and the phase of a clock obtained by dividing the recording clock by n are synchronized with each other, and thus generates a recording clock of a frequency n/m times the wobble clock.

Timing interpolation circuit 215 specifies the position to record or to read recording data on optical disc 200, based on the ADIP information and the values of n and m supplied by system controller 216. Timing interpolation circuit 215 causes a data timing interpolation counter to operate by the generated recording clock, and interpolates the boundary of a following record block with the accuracy of one channel bit. When the target position for recording data is indicated by the data timing interpolation counter, recording signal generating circuit 208 and laser diode driver 207 operate to start recording of data.

Figure 7:
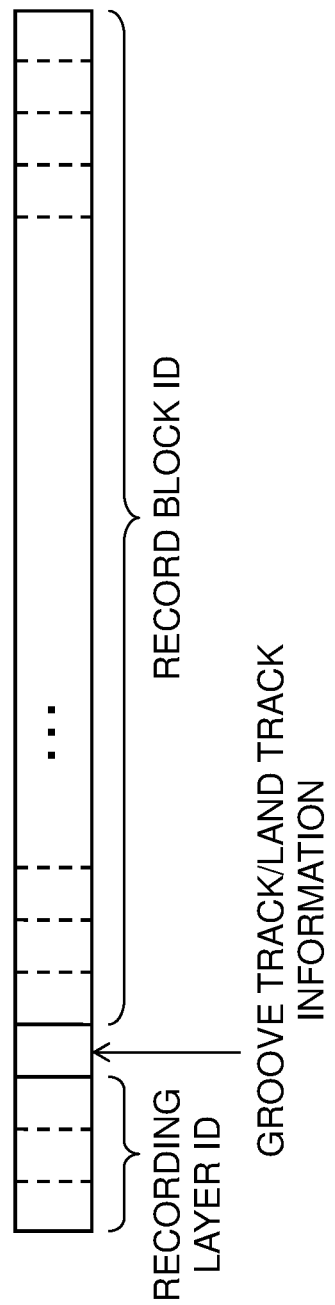
FIG. 7 is a diagram showing a structure of a data address according to the first exemplary embodiment.

Each record block of recording data is recorded with data address. FIG. 7 is a diagram showing a structure of a data address according to the present exemplary embodiment. A data address is structured from a recording layer ID, a record block ID, and groove track/land track information. The recording layer ID is information indicating the ID of a recording layer where data is recorded. The record block ID is information indicating a record block ID of data. The groove track/land track information is information indicating whether the location where data is recorded is a land track or a groove track.

In the case of recording record block M, the ID of the record block is M. Recording data to which a data address is added is modulated into a data signal by data modulation circuit 209. The data signal is generated as a recording signal by being combined with run-in signal G or run-in signal L by recording signal generating circuit 208. The recording signal is recorded in a track of optical disk 200 by laser diode driver 207 and optical head 201.

Next, a read-out operation of optical disk device 20 according to the present exemplary embodiment will be described.

Specification of a reading position on optical disk 200 is the same as the operation of specification of a recording position in the recording operation. When the data timing interpolation counter operated by timing interpolation circuit 215 reaches to the position of a record block to be read, AGC/PLL circuit 204, data demodulation circuit 205, and error correction decoding circuit 206 starts to read data.

AGC/PLL circuit 204 controls gain of an amplifier for amplifying an acquired signal to keep the amplitude of the acquired signal acquired from optical disk 200 by optical head 201 constant. In the present exemplary embodiment, the repeat patterns of run-in G and run-in L are determined such that the amplitude of an acquired signal including a noise from the adjacent track is approximately constant between the run-in region and the cluster region. Accordingly, large difference of amplitude, like shown in FIG. 5, does not appears, and a long transient response time is not caused, and an acquired signal may be stably obtained. AGC/PLL circuit 204 generates a synchronous clock synchronized with the recorded channel bit from the acquired signal.

Data demodulation circuit 205 selects the closest expected waveform, which amplitude is closest to the amplitude of the acquired signal, among expected waveforms at the timing of generated synchronous clock, and outputs original data of the expected waveform as a demodulation result.

Error correction decoding circuit 206 corrects the error of the demodulated data and recovers the data.

The position of recording/reading of data is determined by channel-clock PLL circuit 213 and timing interpolation circuit 215. This operation is performed based on a zone table including the list of values of the ratio n/m of the frequencies of wobble clock and recording clock.

System controller 216 refers to the zone table according to the zone format identifier read from the BCA, specifies each value, and performs recording/reading operation of data as described above.

As described above, optical disk 200 uses the land-and-groove recording technology, and the run-in recording pattern included in a record block to be recorded is different for a groove track and a land track. Because a great change due to interference of recording patterns in the groove track and the land track do not appear in the amplitude of an acquired signal acquired from optical disk 200, optical disk device 20 may stably read data recorded on optical disk 200.

The present disclosure is applicable to an optical disk on which data is optically recorded, and an optical disk device for performing recording/reading of data with respect to the optical disk.

What is claimed is:

1. An optical disk comprising land tracks and groove tracks which are alternately arranged in a radial direction,
wherein the optical disk is capable of recording a bit pattern on each of the land tracks and the groove tracks by forming marks and spaces,
each of the land tracks and the groove tracks includes a plurality of record blocks,
each of the plurality of record blocks includes a run-in region and a data region,
a predetermined run-in pattern is recordable in the run-in region, and a data pattern based on recording target data is recordable in the data region,
in a land track and a groove track that are adjacent to each other in the radial direction of the optical disk, a first record block that is the record block of the land track and a second record block that is the record block of the groove track and that corresponds to the first record block are recorded at a same angular position in a circumferential direction of the optical disk, and
a first run-in pattern to be recorded in the run-in region of the first record block and a second run-in pattern to be recorded in the run-in region of the second record block are different from each other, and
wherein the first run-in pattern is a repeated pattern of one or more first unity patterns,
the second run-in pattern is a repeated pattern of one or more second unity patterns,
the first unity pattern and the second unity pattern are patterns whose pattern length is a first length,
each of the first unity pattern and the second unity pattern is a combination of the marks and the spaces of several lengths,
each of the first unity pattern and the second unity pattern includes one longest pattern whose length is longest among the several lengths,
a distance between longest patterns is a shortest distance among distances between the longest pattern in a whole of the first run-in pattern and the longest pattern in a whole of the second run-in pattern, and the longest pattern in the first unity pattern and the longest pattern in the second unity pattern are arranged at positions where the distance between longest patterns is greatest.

2. The optical disk according to claim 1, wherein a pattern, in the second run-in pattern, adjacent to the longest pattern in the first run-in pattern, and a pattern, in the first run-in pattern, adjacent to the longest pattern in the second run-in pattern are patterns of a length that is half or less than a length of the longest pattern.

3. The optical disk according to claim 1, wherein the marks and the spaces of each of the first run-in pattern and the second run-in pattern are inverted odd number of times.

4. An optical disk comprising land tracks and groove tracks which are alternately arranged in a radial direction,
   wherein the optical disk is capable of recording a bit pattern on each of the land tracks and the groove tracks by forming marks and spaces,
   each of the land tracks and the groove tracks includes a plurality of record blocks,
   each of the plurality of record blocks includes a run-in region and a data region,
   a predetermined run-in pattern is recordable in the run-in region, and a data pattern based on recording target data is recordable in the data region,
   in a land track and a groove track that are adjacent to each other in the radial direction of the optical disk, a first record block that is the record block of the land track and a second record block that is the record block of the groove track and that corresponds to the first record block are recorded at a same angular position in a circumferential direction of the optical disk, and
   a first run-in pattern to be recorded in the run-in region of the first record block and a second run-in pattern to be recorded in the run-in region of the second record block are different from each other, and
   wherein the first run-in pattern is a repeated pattern of one or more first unity patterns,
   the second run-in pattern is a repeated pattern of one or more second unity patterns,
   the first unity pattern and the second unity pattern are patterns whose pattern length is a first length,
   each of the first unity pattern and the second unity pattern is a combination of the marks and the spaces of several lengths,
   each of the first unity pattern and the second unity pattern includes one longest pattern whose length is longest among the several lengths,
   a distance between longest patterns is a shortest distance among distances between the longest pattern in a whole of the first run-in pattern and the longest pattern in a whole of the second run-in pattern, and
   the distance between longest patterns is longer than a length at which intersymbol interference occurs in an acquired signal that is obtained by irradiating a laser to a track where a pattern is recorded.

5. An optical disk recording/reading method for performing recording and reading of data on an optical disk,
   wherein the optical disk includes land tracks and groove tracks each including a plurality of record blocks, and is capable of recording a bit pattern on each of the land tracks and the groove tracks by forming marks and spaces,
   each of the plurality of record blocks includes a run-in region and a data region,
   the land tracks and the groove tracks are alternately arranged in a radial direction of the optical disk, and
   the optical disk recording/reading method comprises:
      recording, in a land track and a groove track that are adjacent to each other in the radial direction of the optical disk, on a first record block that is the record block of the land track and on a second record block that is the record block of the groove track and that corresponds to the first record block at a same angular position in a circumferential direction of the optical disk,
      recording a first run-in pattern on the run-in region of the first record block,
      recording a second run-in pattern which is different from the first run-in pattern on the run-in region of the second record block, and
      recording a data pattern obtained by modulating recording target data with a predetermined modulation code on the data region, and
   wherein the first run-in pattern is a repeated pattern of one or more first unity patterns,
   the second run-in pattern is a repeated pattern of one or more second unity patterns,
   the first unity pattern and the second unity pattern are patterns whose pattern length is a first length,
   each of the first unity pattern and the second unity pattern is a combination of the marks and the spaces of several lengths,
   each of the first run-in pattern and the second run-in pattern includes one longest pattern whose length is longest among the several lengths,
   a distance between longest patterns is a shortest distance among distances between the longest pattern in a whole of the first run-in pattern and the longest pattern in a whole of the second run-in pattern, and
   the longest pattern in the first unity pattern and the longest pattern in the second unity pattern are arranged at positions where the distance between longest patterns is greatest.

6. The optical disk recording/reading method according to claim 5, wherein a pattern, in the second run-in pattern, adjacent to the longest pattern in the first run-in pattern, and a pattern, in the first run-in pattern, adjacent to the longest pattern in the second run-in pattern are patterns of a length that is half or less than a length of the longest pattern.

7. The optical disk recording/reading method according to claim 5, wherein the marks and the spaces of each of the first run-in pattern and the second run-in pattern are inverted an odd number of times.

8. An optical disk recording/reading method for performing recording and reading of data on an optical disk,
   wherein the optical disk includes land tracks and groove tracks each including a plurality of record blocks, and is capable of recording a bit pattern on each of the land tracks and the groove tracks by forming marks and spaces,
   each of the plurality of record blocks includes a run-in region and a data region,
   the land tracks and the groove tracks are alternately arranged in a radial direction of the optical disk, and
   the optical disk recording/reading method comprises:
      recording, in a land track and a groove track that are adjacent to each other in the radial direction of the optical disk, on a first record block that is the record block of the land track and on a second record block that is the record block of the groove track and that corresponds to the first record block at a same angular position in a circumferential direction of the optical disk, recording a first run-in pattern on the run-in region of the first record block, recording a second run-in pattern which is different from the first run-in pattern on the run-in region of the second record block, and recording a data pattern obtained by modulating recording target data with a predetermined modulation code on the data region, and wherein the first run-in pattern is a repeated pattern of one or more first unity patterns, the second run-in pattern is a repeated pattern of one or more second unity patterns, the first unity pattern and the second unity pattern are patterns whose pattern length is a first length, each of the first unity pattern and the second unity pattern is a combination of the marks and the spaces of several lengths, each of the first unity pattern and the second unity pattern includes one longest pattern whose length is longest among the several lengths, a distance between longest patterns is a shortest distance among distances between the longest pattern in a whole of the first run-in pattern and the longest pattern in a whole of the second run-in pattern, and the distance between longest patterns is longer than a length at which intersymbol interference occurs in an acquired signal that is obtained by irradiating a laser to a track where a pattern is recorded.

9. An optical disk recording/reading device for performing recording and reading of data on an optical disk, wherein the optical disk includes land tracks and groove tracks each including a plurality of record blocks, and is capable of recording a bit pattern on each of the land tracks and the groove tracks by forming marks and spaces, each of the plurality of record blocks includes a run-in region and a data region, the land tracks and the groove tracks are alternately arranged in a radial direction of the optical disk, the optical disk recording/reading device comprises:
an optical head for recording data on the optical disk by irradiating a light beam to the optical disk,
a modulation circuit for modulating recording target data with a predetermined modulation code to obtain a modulation signal, and
a controller for performing control so as to record the modulation signal on the data region, and the controller
records, in a land track and a groove track that are adjacent to each other in the radial direction of the optical disk, on a first record block that is the record block of the land track and on a second record block that is the record block of the groove track and that corresponds to the first record block at a same angular position in a circumferential direction of the optical disk, records a first run-in pattern on the run-in region of the first record block, and records a second run-in pattern which is different from the first run-in pattern on the run-in region of the second record block, and wherein the first run-in pattern is a repeated pattern of one or more first unity patterns, the second run-in pattern is a repeated pattern of one or more second unity patterns, the first unity pattern and the second unity pattern are patterns whose pattern length is a first length, each of the first unity pattern and the second unity pattern is a combination of the marks and the spaces of several lengths, each of the first run-in pattern and the second run-in pattern includes one longest pattern whose length is longest among the several lengths, a distance between longest patterns is a shortest distance among distances between the longest pattern in a whole of the first run-in pattern and the longest pattern in a whole of the second run-in pattern, and the longest pattern in the first unity pattern and the longest pattern in the second unity pattern are arranged at positions where the distance between longest patterns is greatest.

10. An integrated circuit for controlling recording of data on an optical disk, wherein the optical disk includes land tracks and groove tracks each including a plurality of record blocks, and is capable of recording a bit pattern on each of the land tracks and the groove tracks by forming marks and spaces, each of the plurality of record blocks includes a run-in region and a data region, the land tracks and the groove tracks are alternately arranged in a radial direction of the optical disk, and the integrated circuit
records, in a land track and a groove track that are adjacent to each other in the radial direction of the optical disk, on a first record block that is the record block of the land track and on a second record block that is the record block of the groove track and that corresponds to the first record block at a same angular position in a circumferential direction of the optical disk, records a first run-in pattern on the run-in region of the first record block, records a second run-in pattern which is different from the first run-in pattern on the run-in region of the second record block, and records a data pattern obtained by modulating recording target data with a predetermined modulation code on the data region, and wherein the first run-in pattern is a repeated pattern of one or more first unity patterns, the second run-in pattern is a repeated pattern of one or more second unity patterns, the first unity pattern and the second unity pattern are patterns whose pattern length is a first length, each of the first unity pattern and the second unity pattern is a combination of the marks and the spaces of several lengths, each of the first run-in pattern and the second run-in pattern includes one longest pattern whose length is longest among the several lengths, a distance between longest patterns is a shortest distance among distances between the longest pattern in a whole of the first run-in pattern and the longest pattern in a whole of the second run-in pattern, and the longest pattern in the first unity pattern and the longest pattern in the second unity pattern are arranged at positions where the distance between longest patterns is greatest.

* * * * *